(12) United States Patent
Edwards

(10) Patent No.: US 6,720,102 B2
(45) Date of Patent: Apr. 13, 2004

(54) ROTATING FUEL CELL

(76) Inventor: Thomas C. Edwards, 1426 Gleneagles Way, Rockledge, FL (US) 32955

(*) Notice: Subject to any disclaimer, the term of this patent is extended or adjusted under 35 U.S.C. 154(b) by 119 days.

(21) Appl. No.: 09/990,146

(22) Filed: Nov. 21, 2001

(65) Prior Publication Data

US 2003/0096148 A1 May 22, 2003

(51) Int. Cl.⁷ .............................. H01M 8/10; H01M 8/24
(52) U.S. Cl. ........................................... 429/32; 429/39
(58) Field of Search ............................. 429/12, 32, 34, 429/38, 39

(56) References Cited

U.S. PATENT DOCUMENTS

| | | | | |
|---|---|---|---|---|
| 3,751,302 A | * | 8/1973 | Johnsen | 429/13 |
| 4,521,497 A | * | 6/1985 | Tamminen | 429/27 |
| 5,830,593 A | * | 11/1998 | Nielson | 429/34 X |
| 6,379,828 B1 | * | 4/2002 | Worth | 429/34 X |
| 2002/0197517 A1 | * | 12/2002 | MacKelvie | 429/38 X |

FOREIGN PATENT DOCUMENTS

EP 333364 * 9/1989 ............ H01M/8/02

* cited by examiner

*Primary Examiner*—Stephen Kalafut
(74) *Attorney, Agent, or Firm*—Roger W. Jensen

(57) ABSTRACT

A rotating fuel cell has a mounting with bearing means defining a rotary axis. A shaft with a longitudinally-extending bore is supported for rotation on the bearings. At least one PEM fuel cell assembly is mounted on the shaft and insulated therefrom, and also has a gas passageway in register with a radially-extending port in the shaft. Connections are provided for admitting hydrogen gas to the hollow bore. Air (oxygen) is supplied to the exterior of the PEM fuel cell assembly. The shaft and the PEM fuel cell assembly is rotated about the axis.

21 Claims, 4 Drawing Sheets

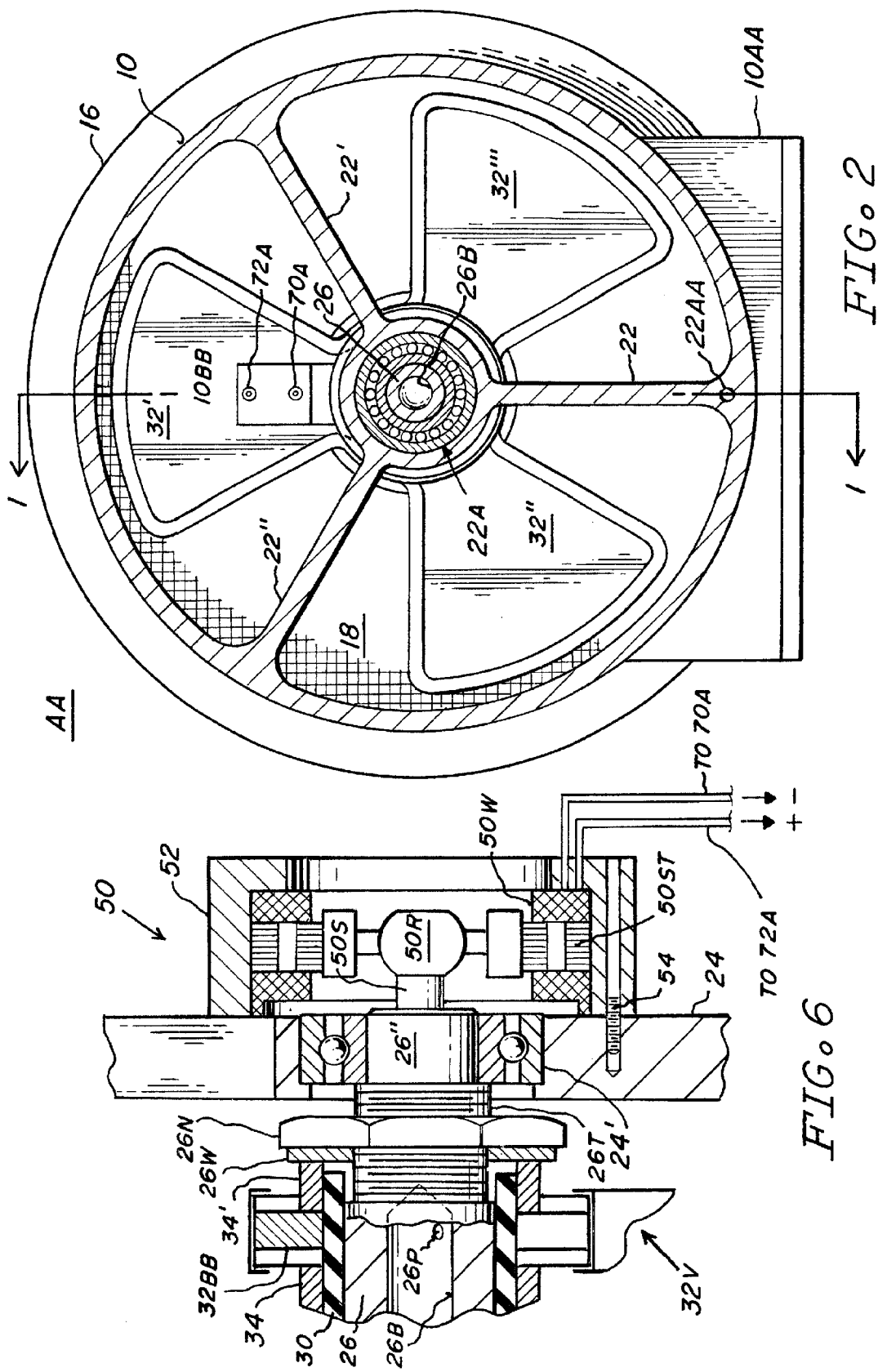

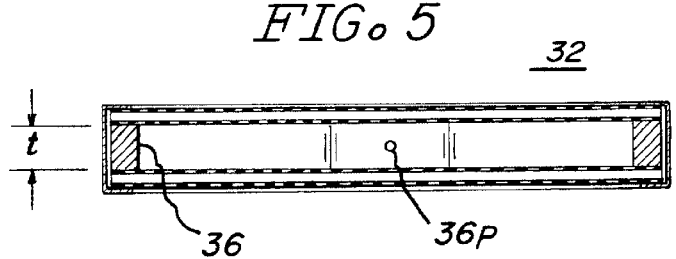
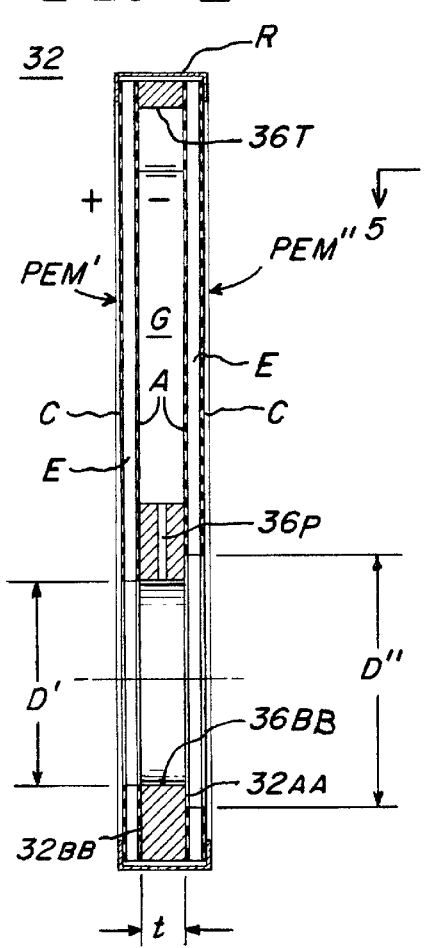
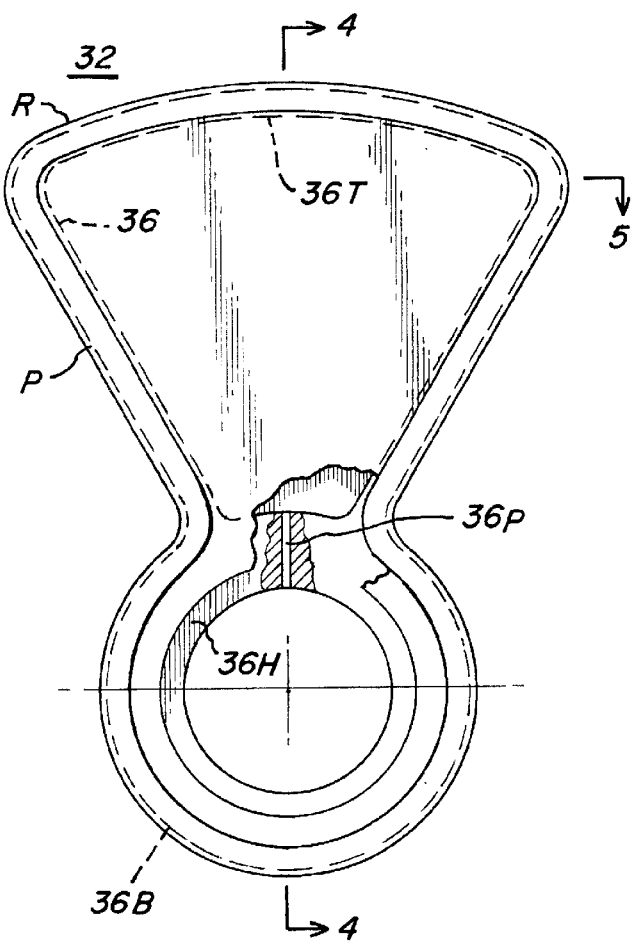

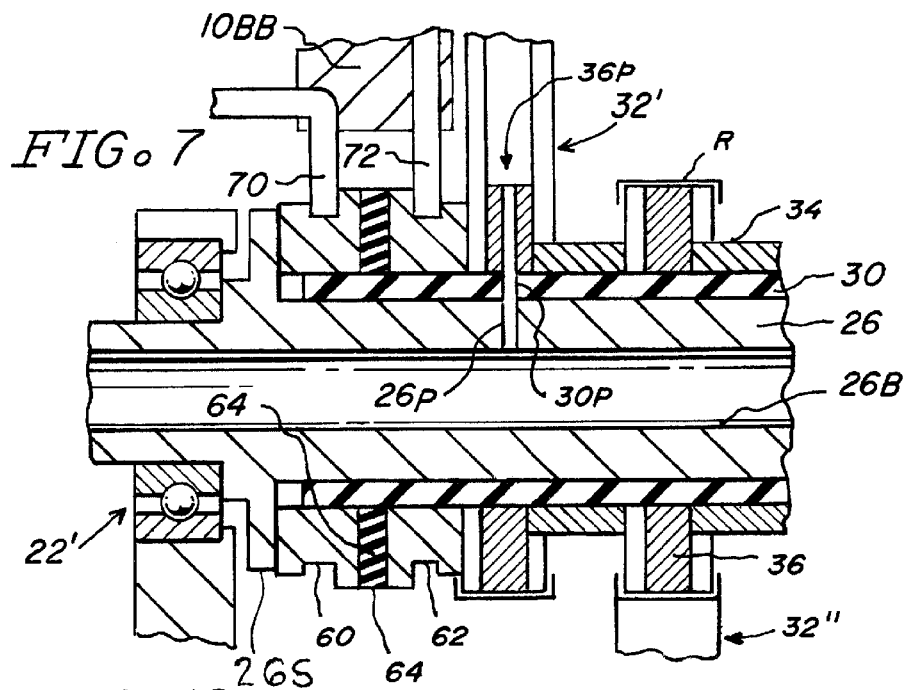
FIG. 7
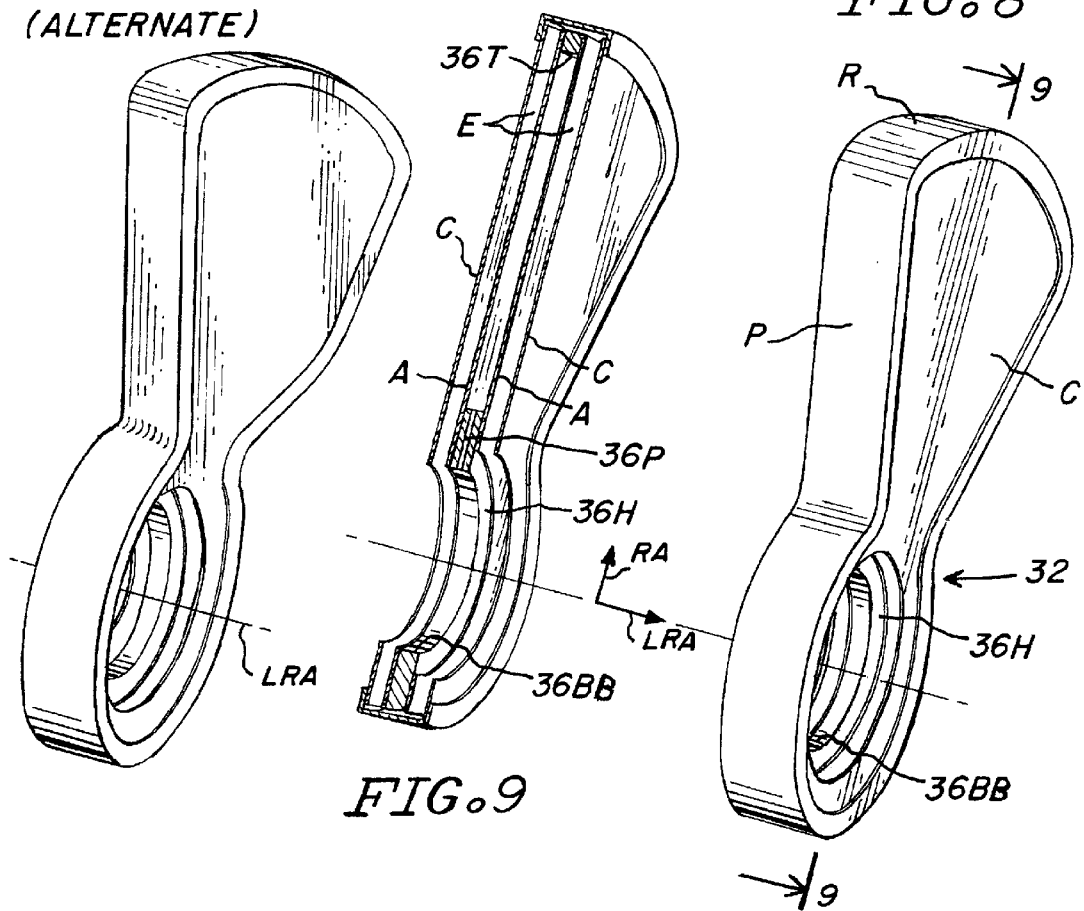
FIG. 10 (ALTERNATE)
FIG. 9
FIG. 8

ROTATING FUEL CELL

BACKGROUND AND SUMMARY OF THE INVENTION

A fuel cell is an electrochemical device that utilizes a fuel (hydrogen) that is combined with oxygen to produce electric power, water, and heat. Importantly, there are no combustion processes taking place, so emissions such as $CO_2$ and NOX are eliminated. Further, fuel cells are particularly efficient compared to combustion engines.

No matter what type, Solid Oxide, Proton Exchange Membrane (PEM), etc., all fuel cells have the same basic constituents: the anode, the electrolyte and the cathode. The anode is in contact with the hydrogen fuel and the cathode is in contact with the oxidant. As the fuel cell's reverse electrolysis takes place through the electrolyte wherein electric power is produced, water is formed on the surface of the cathode as oxygen combines with the ionized hydrogen (protons) that cross the electrolyte. The entire assembly also becomes heated due to the exothermal chemical process as it creates electricity.

Conventional fuel cells are static devices wherein numerous anode/electrolyte/cathode cells are connected, generally in series, because the voltage produced by each fuel cell element is low, about a volt. Each fuel cell stack element is about 0.1 inches thick and, typically 5 to 10 inches square. Within each of these stack elements are various structural components that facilitate the supply of air (oxygen) and hydrogen as well as means to circulate cooling water within the fuel cell stack and remove water formed during operation.

The present invention reveals a new type of fuel cell configuration that offers many attributes, especially in association with PEM fuel cells At its core, the rotating fuel cell, as its name implies, is a dynamic stack of fuel cell elements, called PEM "blades" hereinafter, that rotate within the surrounding air (oxidant stream) This dynamic fuel cell configuration has numerous advantages:

Direct cathode exposure to the ambient air at a relative slow velocity, dissipates fuel cell waste heat readily; conventional fuel cell stack require complex internal water-cooling systems. The present invention simply transfers the heat directly to the ambient (or pressurized) air (much as in an air cooled engine) and not only eliminates the internal stack cooling system, but also eliminates the entire heat transfer system required to reject the heat gathered in the stack.

The centrifugal force that arises due to the rotation of the fuel cell assembly readily rids the cathode of the accumulation of water that occurs to produce electricity (and heat). Keeping the exposed cathode surface free of water ("slinging it away") improves the performance of the fuel cell because the surrounding air (oxygen) is always in contact with the cathode; the presence of liquid water gets in the way of air.

Because the fuel cell blades of the rotating fuel cells are constantly in contact with new and turbulent air, the cathodic surface oxygen concentration will always be maximized.

Perhaps most important, the fuel cell blades can be arranged in a fashion such that the rotating fuel cell assembly causes its own aspiration (much like a fan).

SUMMARY OF THE INVENTION

The present invention, in broad terms, provides a rotating fuel cell comprising a housing means having bearing means which define a longitudinally-extending rotary axis. The fuel cell further includes an elongated shaft rotatably supported on the bearing means; the shaft has a hollow bore extending from one end thereof to a preselected length. The shaft further has a radially-extending port connecting the hollow bore to the outer surface of the shaft. A radially-extending PEM fuel cell assembly is positioned on the shaft to rotate therewith. The PEM fuel cell assembly has a gas passage therein which is in register with the port of the shaft. Means are provided for supplying hydrogen gas to the hollow bore of the shaft. Air (oxygen) is supplied to the exterior of the PEM fuel cell assembly. Motor means are connected to one end of the shaft and is adapted to rotate the shaft and the PEM fuel cell assembly about the axis in the oxidant. Electrical output means are connected to the PEM fuel cell assembly, e.g., slip rings, rotating transformer, etc.).

In a preferred embodiment of the invention depicted in the drawings, a plurality of radially-extending PEM fuel cell assemblies are arranged in a stack and positioned on the shaft in side-by-side longitudinally-spaced-apart relationship; each of the assemblies having a gas passageway in register with one of a plurality of radially-extending and longitudinally-spaced-apart ports in the shaft. In all embodiments, the PEM fuel cell assemblies comprise a blade which is adapted, when rotated, to cause air, i.e., oxidant, to flow longitudinally against and around the assembly(ies). Also in the preferred embodiment, the shaft is electrically conductive and insulative means are positioned between the outer periphery of the shaft and the plurality of PEM assemblies. The PEM assemblies are electrically connected in series relationship to produce a total output voltage which is a function of the multiple of the output voltage of one assembly.

BRIEF DESCRIPTION OF THE DRAWINGS

FIG. 2 is cross-section of the apparatus shown in FIG. 1 as viewed along section lines 2—2 of FIG. 1;

FIG. 3 is a plan view, partly in section, of a PEM fuel cell blade assembly 32;

FIGS. 4 and 5 are cross-sectional views of the apparatus shown in FIG. 3 as viewed respectively along section lines 4—4 and 5—5 thereof;

FIG. 6 is an enlargement of the apparatus shown in FIG. 1, showing the connection of a motor means 50 to one end of the rotatable hollow shaft 26;

FIG. 7 is an enlargement of the apparatus shown in FIG. 1, more specifically the other end of the hollow shaft 26 with clarifying detail of features, including the slip rings 60 and 62 and their respective associated wipers 70 and 72;

FIG. 8 is an isometric view of the fuel cell blade assembly 32;

FIG. 9 is an isometric cross-section of the assembly 32 as viewed along section lines 9—9 of FIG. 8;

FIG. 10 is an isometric view of an alternate-shaped fuel cell blade assembly.

DETAILED DESCRIPTION OF THE INVENTION

Figure 1:
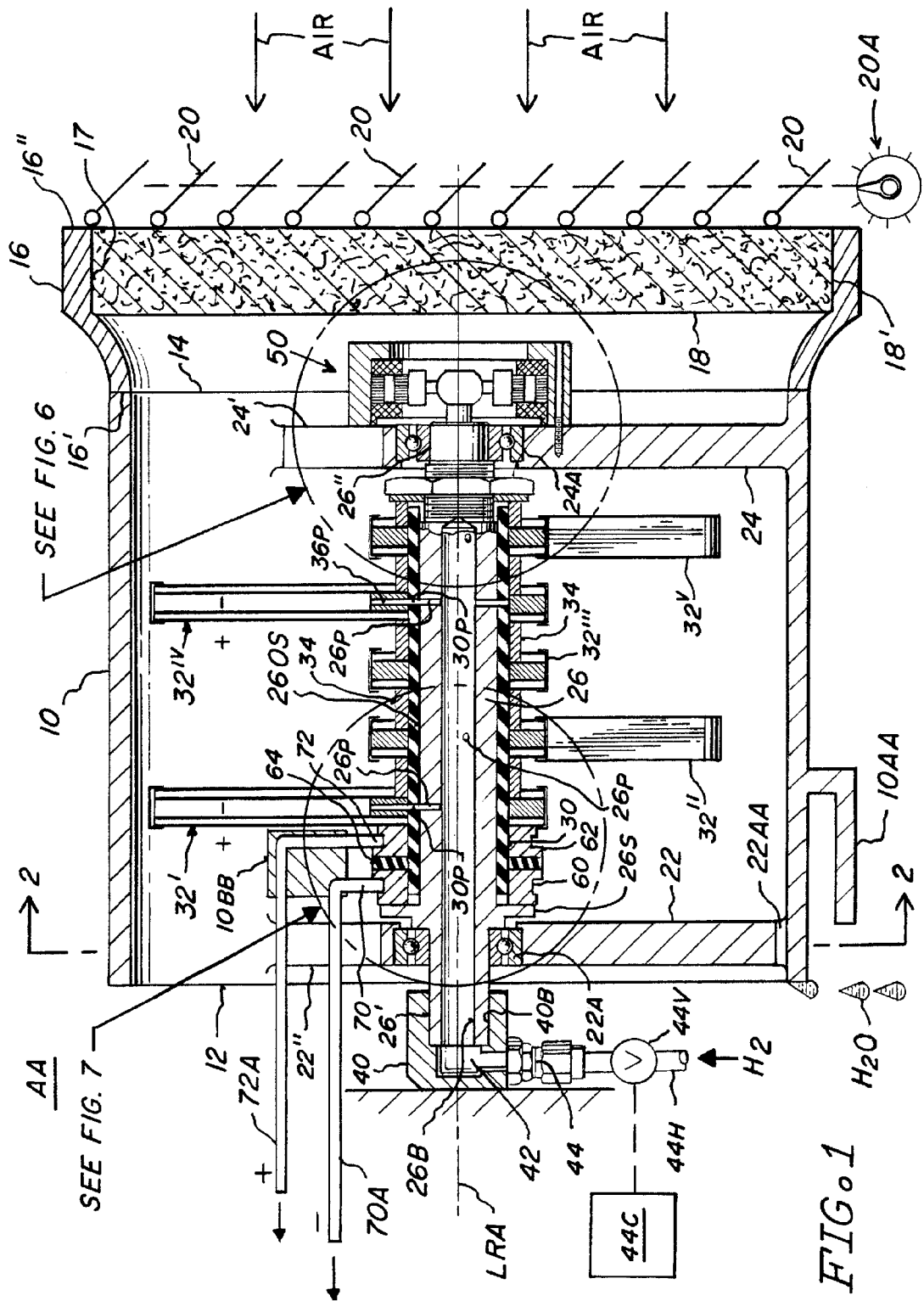
FIG. 1 is a longitudinal cross-sectional view of a preferred embodiment of my invention as viewed along section lines 1—1 of FIG. 2.

FIGS. 1 and 2 show a rotating fuel cell apparatus AA comprising an elongated hollow housing means 10 having first and second longitudinally-spaced-apart open ends 12 and 14. An auxiliary housing member 16 is also hollow and has one end 16' dimensioned so as to register with the open end 14 of housing 10, and a second end 16" of somewhat increased diameter so as to receive a circularly-shaped air filter means 18 having an outer periphery 18' dimensioned so as to snugly fit within the inner surface 17 of housing member 16.

A base portion 10AA is provided for supporting the rotating fuel cell.

Shaft supporting means are provided within the housing 10. More specifically, at the left end of the housing as depicted in FIG. 1 are a set of three transversely or radially-extending bearing supports 22, 22', and 22" which, as shown in FIG. 2, are equally circumferentially spaced apart around a longitudinally-extending rotary axis LRA within the housing. A similar bearing support 24, 24', and a third (not shown) are provided at the other end of the housing 10. The bearing supports 22, etc. and 24, etc., respectively support bearing means 22A and 24A which jointly define the longitudinally-extending rotary axis LRA.

An electrically conductive elongated shaft 26 having first and second ends 26' and 26" are rotatably supported by the inner races of the bearing means 22A and 24A. The elongated outer surface of the shaft is identified by reference numeral 26OS. Shaft 26 has a centrally positioned bore 26B extending longitudinally from end 26" a preselected length along the shaft 26 but does not extend the full length, as is clearly shown in FIG. 1. The shaft 26 further has a plurality of longitudinally-spaced-apart, radially-extending ports 26P connecting the hollow bore 26B to the outer surface 26OS.

Electrical insulative means 30 are layered on said outer surface 26OS of shaft 26 and includes openings 30P therein which are in register with the radially-extending ports 26P of the shaft. A plurality of PEM fuel cell blade assemblies 32 are mounted on and secured to the shaft so as to rotate therewith. A representative fuel cell blade assembly is shown in FIGS. 3, 4, 5, 8, and 9. FIG. 1 depicts a stack of five (5) separate PEM fuel cell blade assemblies arranged on the shaft 26 in axially spaced-apart relationship; they are identified from left to right as shown in FIG. 1 by reference numerals 32', 32", 32''', 32iv, and 32v. The fuel cell blade assemblies are spaced apart by electrically conductive tubular spacers 34 as shown in FIG. 1.

Referring to FIGS. 3–5, 8, and 9, a typical PEM fuel cell blade assembly comprises an anodic metallic frame 36 having a preselected shaped periphery P, longitudinal thickness t (see FIG. 4), and opposed axial faces 32AA and 32BB. The top or outer end (as measured from the LRA) of anodic frame 36 is identified by reference 36T, and the bottom portion of 36 which is concentric with the LRA is identified by reference 36B. In addition, each PEM fuel cell blade assembly comprises a pair of PEMs, i.e., PEM' and PEM" having peripheries shaped to be substantially identical to the periphery P of the anodic frame and further are respectively abutted against and attached to the opposed faces 32AA and 32BB of the anodic frame so as to define therebetween a radially-extending gap G, shown in FIG. 4. The blade assemblies further comprise an electrically conductive sealing rim R which connects said pair of PEMs at their peripheries. Sealing rims R are not in electrical contact with the anodic frame 36. Further, a hydrogen gas passageway 36P extends between the gap G and an inner bore 36BB of the anodic frame 36. The diameter of the bore 36BB is identified by reference D' and it is preselected so that it will snugly embrace the outer periphery of the insulative means 30 surrounding shaft 26. PEM' has a bore therein in register with and the same diameter as bore 36BB. PEM" has a larger bore diameter D" concentric with bore 36, the diameter D" being preselected so as to snugly fit the outer diameter of conductive spacers 34.

Each PEM comprises an anode A, a cathode C, with an electrolyte E positioned therebetween (see FIGS. 4 and 9).

Means are provided for supplying hydrogen gas from a suitable source to the hollow bore 26B of shaft 26 and thence through ports 26P, 30P, and 36P to flow into engagement with the anodes A of the PEMs. The means for supplying the hydrogen gas, as depicted in FIG. 1 as a representative but not limiting arrangement, is a rotary coupling means 40 which is stationary and has an inner bore 40B sized so as to receive the extreme left end 26' of shaft 26, this being a rotary connection. Coupling 40 further includes a passageway 42 and appropriate nipple or the like for a tubular coupling 44 for a piping means 44H connected to a source of Hydrogen ($H_2$). A valve 44V may be provided for regulating and/or controlling the flow of hydrogen through the coupling 40 to the bore 26B of the shaft 26. The valve 44V is optional; in some cases it may be manually controlled or automatically controlled by apparatus 44C. Another or alternate arrangement for providing hydrogen is to have bore 26B extend throughout the entire shaft 26 (in a closed-loop configuration) to provide a circulatory path for the hydrogen, and thus the proper $H_2$ concentration throughout.

Referring to FIG. 6, the right end of shaft 26 as shown in FIG. 1 has a threaded portion 26T axially adjacent to the end 26" which fits within the inner race of bearing means 24'. An electrically conductive tubular spacer 34' abuts against face 32AA of the anodic frame 36 of PEM 32v. An electrically conductive washer 26W has an axial face abutting the outboard axial end of spacer 34'; a jam nut 26N threaded on the threads 26T of the shaft is rotated to maintain the washer 26W in tight good electrical contact with the spacer 34'. At the other end of the stacked PEM fuel cell blade assemblies, the shaft 26 has a radially-extending flange or shoulder 26S (see FIGS. 1 and 7) inboard of the bearing support 22. A pair of slip rings 60 and 62 are mounted on the insulative sleeve 30. Slip ring 60 is in abutment and electrical contact with shoulder 26S of the shaft. The slip rings are separated from one another by an insulative washer 64. Slip ring 62 has its inboard axial face in electrical contact with the cathode C of PEM' of assembly 32'.

The jam nut 26N is effective to provide axial pressure along the shaft so as to keep all of the assemblies and the slip rings under sufficient axial pressure so that they will rotate with the shaft 26 when it is rotated, as will be discussed below.

Slip ring wiper means 70 and 72 are mounted on the housing as by suitable means 10BB and respectively engage the slip rings 60 and 62. Slip ring wiper means 70 and 72 are respectively connected by output leads 70A and 72A for supplying a load, not shown, and, usually, also supplying power to the electric motor means 50 which functions to rotate the shaft 26. As shown in FIGS. 1 and 6, the motor means 50 comprises a housing 52 which is connected by suitable means 54 to the bearing support means 24. The housing 52 is depicted as being somewhat cup-shaped to provide on the inner periphery thereof a support for a stator 50ST having appropriate windings 50W, the stator co-acting with a rotor member 50R attached or connected to the shaft 26 by a stub-shaft 50S. The motor stator windings 50W are connected to a suitable power supply which, when current is applied to the winding 50W, functions to cause the rotor 50R to rotate the shaft 26 relative to the housing 10. In a preferred embodiment, the winding 50W is connected to the leads 70A and 72A, i.e., the power output from the fuel cell. Thus, the fuel cell not only generates power for an external load, but also provides the small requisite power for operating the motor means 50.

An adjustable shutter means 20 is provided adjacent the outboard surface of the air filter means 18; an adjustable means 20A is shown linked or connected to the shutters 20 so as to regulate the amount of air which is permitted to flow through the filter 18 and thence across and around the individual fuel cell blade assemblies. The air flow control means provides a means for controlling the temperature of the stack of fuel cell blade assemblies.

A port or bore 22AA is provided at the bottom of bearing support as shown in FIG. 1, i.e., adjacent to the juncture of the bearing support with the housing or shroud 10; the function of the port 22AA is to permit water centrifugally thrown off from the fuel cell blade assemblies to be removed from within the housing. The water is represented in FIG. 1 by droplets $H_2O$ flowing away from the housing.

Operation

The PEM fuel cell blade assemblies 32'–32V' are assembled as a stack as indicated above on the assembled shaft 26 and insulative sleeve 30, the conductive sleeve spacers 34 providing electrical connections between adjacent PEM blade assemblies so that they are connected "in series". Each of the conductive sleeves 34 and 34' abuts at the left axial end thereof as shown in FIGS. 1, 6, and 7, against the axial face 32AA of anodic frame 36 of the assembly immediately to the left thereof.

The functioning of the apparatus is simple and very effective. Hydrogen is supplied to the bore 26B of shaft 26 whenever it is desired that the cell provides electrical power. The hydrogen flows through the bore 26B and thence to the individual fuel cell assemblies by way of the aligned ports 26P, 30P and 36P as is clearly shown in FIG. 7. The hydrogen entering the gap G then reacts with the inside structure (anodes) of the PEMs, the outside surfaces (cathodes) of which are exposed to air (oxidant) which enters the housing 10 through the filter means 18, with the air flowing against and around the individual blades of the fuel cell assemblies. Thus there is direct cathode exposure to the ambient air. Further, since the motor 50 is rotating the entire stack, there is a fan effect created by the blade rotation to increase the flow of air across the stack. The airflow is extremely important so as to remove heat from the unit to avoid excessive temperatures. As indicated, the shutters 20 are adjusted to provide desired temperature of the stack. Auxiliary air can also be introduced between the PEM blades (or disks) by a fan or compressor and a suitable air distribution system interposed therebetween.

The centrifugal force from the rotating stack also has the advantage of readily ridding the cathodes of the accumulation of water that occurs at its surface as a result of combining hydrogen and oxygen to produce electricity (and heat). Keeping the exposed cathode surfaces free of water ("slinging it away") improves the performance and efficiency of the fuel cell because the surrounding air (oxygen) is always in contact with the cathode. In other words, the overall efficiency is improved because the liquid water which would otherwise get in the way of the air is removed rapidly through centrifugal action which thereby also maximizes the opportunity of the oxygen in the air coming in contact with the cathode. Thus, the rotating fuel cell blades are constantly in contact with new and turbulent high-$O_2$- concentration air. Again, the cathodic surface oxygen concentration will always be maximized. Very importantly, the fuel cell blades can be arranged in a fashion such that the rotating fuel cell assembly causes its own aspiration and does not require an air compressor to supply oxidant. This fan function can be controlled by the design of the shape of the blade. The blades shown in FIGS. 1 and 8 are essentially planar, whereas an alternate configuration is shown in FIG. 10 wherein the outer portion of the blade has a twist away from the planar, as can be noted from a comparison thereof with the blade shown in FIG. 8.

As indicated, the stator windings 50W of motor 50 are typically connected to the output from the fuel cell so that the unit is self-contained, i.e., does not require external electrical power for start-up. In a typical operation, as soon as the hydrogen is admitted to the bore 26B, then the unit will begin to function and generate electrical outputs at leads 70A and 72A; concurrently, this output voltage will be applied to the motor 50 to bring the motor up to a desired speed of rotation.

Those skilled in the art will understand that the shape of the periphery P of the blades 32 may vary greatly within the scope of this invention. For example, a full diameter disk "blade" would resemble a phonograph record.

While the preferred embodiment of the invention has been illustrated, it will be understood that variations may be made by those skilled in the art without departing from the inventive concept. Accordingly, the invention is to be limited only by the scope of the following claims.

I claim:

1. A rotating fuel cell comprising:
   (i) mounting means having bearing means defining a longitudinally extending rotary axis;
   (ii) a shaft having first and second ends rotatably supported on said bearing means, said shaft having an outer surface and a hollow bore extending a preselected length from said first end thereof, said shaft further having a radially-extending port connecting said hollow bore to said outer surface;
   (iii) a radially-extending PEM fuel cell assembly positioned on said shaft to rotate therewith, said PEM fuel cell assembly having a gas passage in register with said port of said shaft;
   (iv) means for providing hydrogen gas to said hollow bore of said shaft;
   (v) means connected to said second end of said shaft and being adapted to rotate said shaft and PEM fuel cell assembly about said axis; and
   (vi) electrical output means connected to said PEM fuel cell assembly.

2. The fuel cell of claim 1 wherein said PEM fuel cell assembly comprises a blade which is adapted when rotating with said shaft, to cause air to flow longitudinally against and around said PEM fuel cell assembly.

3. The fuel cell of claim 1 wherein said means adapted to rotate said shaft is mounted on said mounting means.

4. The fuel cell of claim 2 wherein said blade comprises (a) an anodic radially-extending rim-like frame of electrically conductive material having a preselected shaped periphery and preselected longitudinal thickness and opposed axial surfaces, (b) a pair of PEMs having peripheries configured substantially identical to said periphery of said frame, said pair of PEMs being respectively attached to said opposed axial surfaces of said frame so as to define therebetween a radially-extending gap, (c) a sealing rim connected to said peripheries of said PEMs, and (d) a gas passageway extending between said gap and said port of said shaft.

5. The fuel cell of claim 4 wherein said PEM comprises a sandwich of an anode, an electrolyte, and a cathode.

6. The fuel cell of claim 5 wherein said shaft is electrically conductive and is included in said electrical output means.

7. The fuel cell of claim 6 wherein said electrical output means includes a pair of slip ring means on said shaft and a pair of slip ring wiper means on said housing respectively engaging said pair of slip ring means.

8. The fuel cell of claim 1 wherein said means for providing hydrogen gas to said hollow bore of said shaft comprises rotary coupling means mounted on said first end of said shaft and adapted to provide a connection between a supply of hydrogen gas and said hollow bore of said shaft and thence, via said port, to said gap of said PEMs.

9. A rotating fuel cell comprising:
 (i) mounting means having bearing means defining a longitudinally extending rotary axis;
 (ii) a shaft having first and second ends supported on said bearing means for rotation about said axis, said shaft having an outer surface, a hollow bore extending a preselected length from said first end, and at least one radially-extending port connecting said bore with said outer surface;
 (iii) at least one radially-extending PEM fuel cell assembly positioned on said shaft to rotate therewith and having a gas passage in register with said port;
 (iv) means for providing hydrogen gas to said hollow bore of said shaft;
 (v) electrical output means connected to said PEM fuel cell assembly; and
 (vi) means for rotating said shaft relative to said mounting means.

10. The fuel cell apparatus of claim 9 further comprising a plurality of radially-extending PEM fuel cell assemblies positioned in a stack on said shaft in side by side longitudinally-spaced-apart relationship, each of said assemblies having a gas passage in register with one of a plurality of radially-extending and longitudinally-spaced-apart ports in said shaft.

11. The fuel cell apparatus of claim 10 wherein said means for rotating said shaft comprises an electric motor means connected to said shaft.

12. The apparatus of claim 11 wherein said assemblies each comprises a blade adapted, when rotated, to cause air flow longitudinally against and around said assemblies.

13. The apparatus of claim 12 wherein each of said blades comprises (a) an anodic radially-extending rim-like electrically conductive frame having a preselected shaped periphery, a preselected longitudinal thickness, and opposed axially facing surfaces, (b) a pair of PEMs having peripheries substantially identical to said periphery of said frame respectively connected to said opposed axially facing surfaces of said frame so as to define therebetween a radially-extending gap, and (c) a gas passageway extending between said gap and one of said ports of said shaft.

14. The apparatus of claim 13 further characterized by said shaft being electrically conductive and by insulative means being positioned between said shaft and said plurality of PEM assemblies.

15. The apparatus of claim 14 wherein each of said PEMs comprises a sandwich of an anode, an electrolyte, and a cathode.

16. The apparatus of claim 15 wherein said electrical output mean includes slip ring means on said shaft and wiper means on said mounting means.

17. The apparatus of claim 16 including electrically conductive spacers positioned between said assemblies.

18. The apparatus of claim 17 including means on said mounting means for regulating the flow of air longitudinally through said mounting means.

19. The apparatus of claim 13 wherein said blades and PEMs have asymmetrical shapes.

20. The apparatus of claim 19 wherein said asymmetrically shaped blades and PEMs of said axially spaced apart assemblies are positioned on said shaft in a preselected non-aligned order.

21. The apparatus of claim 20 wherein said assemblies are electrically connected in series.

* * * * *